(12) United States Patent
Gu et al.

(10) Patent No.: US 8,138,619 B2
(45) Date of Patent: Mar. 20, 2012

(54) NON-GRID-CONNECTED WIND TURBINE WITH DOUBLE-STATOR DOUBLE-SALIENT BRUSHLESS DC-GENERATOR

(76) Inventors: Weidong Gu, Jiangsu (CN); Ruiyuan Tang, Jiangsu (CN); Yangguang Yan, Jiangsu (CN)

( * ) Notice: Subject to any disclaimer, the term of this patent is extended or adjusted under 35 U.S.C. 154(b) by 547 days.

(21) Appl. No.: 12/304,413

(22) PCT Filed: May 8, 2007

(86) PCT No.: PCT/CN2007/001499
§ 371 (c)(1),
(2), (4) Date: Dec. 11, 2008

(87) PCT Pub. No.: WO2008/124971
PCT Pub. Date: Oct. 23, 2008

(65) Prior Publication Data
US 2010/0066085 A1    Mar. 18, 2010

(30) Foreign Application Priority Data

Apr. 16, 2007   (CN) .......................... 2007 1 0020867

(51) Int. Cl.
H02P 9/04       (2006.01)
(52) U.S. Cl. ............................................ 290/44; 290/55
(58) Field of Classification Search ........................ None
See application file for complete search history.

(56) References Cited

U.S. PATENT DOCUMENTS

| | | | | |
|---|---|---|---|---|
| 1,669,028 A | * | 5/1928 | Soberg | 290/55 |
| 3,484,617 A | * | 12/1969 | Winsel | 290/44 |

FOREIGN PATENT DOCUMENTS

| | | |
|---|---|---|
| CN | 1214809 A | 4/1999 |
| CN | 2649799 Y | 10/2004 |
| WO | WO 9629774 A1 * | 9/1996 |

OTHER PUBLICATIONS

Qiang; "Study & Design of Power Controller for Independent Wind Generator System"; Energy Conservation; 2006; pp. 36-38; No. 3; Institute of Information Engineering, Liaoning Petrochemical University, Fushun, Liaoning.*

Qiang; "Study & Design of Power Controller for Independent Wind Generator System"; Energy Conservation; 2006; pp. 36-38; No. 3; Institute of Information Engineering, Liaoning Petrochemical University, Fushun, Liaoning. (English-language translation attached.).

* cited by examiner

*Primary Examiner* — Tulsidas C Patel
*Assistant Examiner* — Stefan Mikailoff
(74) *Attorney, Agent, or Firm* — The Webb Law Firm

(57) ABSTRACT

Disclosed is a non-grid-connected wind turbine generator system with high power, low cost and high efficiency. The wind turbine generator system includes a wind rotor, a generator and a tower. The wind rotor is a fixed-pitch variable-rotation-speed wind rotor, the wind rotor shaft directly drives a rotor of the generator, and the generator is a power-controlled DC generator, a double-salient brushless DC generator, or a double-stator double-salient brushless DC generator. The rotation speed of the fixed-pitch wind rotor is directly controlled by a power-controlled generator and thereby the attack angle of wind rotor blade is controlled. When wind speed is greater than rated wind speed of the system, the wind rotor is controlled into a state of blade stall so as to limit power output of the wind rotor and effectively broaden the wind speed range of wind rotor.

2 Claims, 3 Drawing Sheets

NON-GRID-CONNECTED WIND TURBINE WITH DOUBLE-STATOR DOUBLE-SALIENT BRUSHLESS DC-GENERATOR

TECHNICAL FIELD

The present invention relates to a wind turbine generator in the technical field of wind power generation, in particular to a high-power wind turbine generator system with simple reliable structure, convenient maintenance, low cost, high efficiency and wide effective wind speed range, which can be directly used in high energy consumption industry.

BACKGROUND ART

Presently, large scale application of wind energy in the world is mainly implemented by way of "wind rotor~generator~electrical power network~user". The electrical power network acts as load of wind power and power supply for user, and ensures the utilization of wind power. Wind power connected to power system is an exclusive application of large scale wind power station in the world. However, the electric current generated by wind power has the characteristic of random great fluctuation due to the high instability of wind energy. Thereby, the ratio of wind power in the electrical power network is restricted seriously so that the usage percentage of wind power in the terminal load is difficult to go beyond 10%, which is a difficult problem in the world. At the same time, for satisfying the critical requirements of stable frequency and stable phase, grid-connected wind power utilizes the latest related technology achievements and materials in the world, which results in the complication of equipment and technique and reduces the usage efficiency of wind power. Thereby, the cost of wind power is greatly raised and the large scale development of wind power industry is restricted seriously.

Wind speed in wind field changes greatly. For a wind turbine rotor with fixed pitch and constant rotation speed, attack angle of airflow with respect to blade airfoil of wind rotor increases with the increase of wind speed in the wind field. When the wind speed reaches a set value, flow separation occurs on the upper surface of blade and thereby blade stall occurs. With the further increase of the wind speed, there is a change from shallow stall to deep stall. FIG. 1 shows foil speed and torque coefficient corresponding to different wind speed, wherein portion 1-1 shows the speeds in deep stall state at point m of the curve in FIG. 1, portion 1-2 shows the speeds in shallow stall state at point n of the curve, portion 1-3 shows the speeds in non-flow-separation state at point p of the curve, where "c" in portion 1-1, 1-2 and 1-3 represents axial speed related to the wind speed, "u" represents tangent speed related to rotational speed of the wind rotor, and "w" represents relative speed related to the blade of the wind rotor. Due to the operation conditions of the wind turbine rotor such as fixed pitch and constant rotation speed, the stable operation limits of the wind turbine are small. In order to increase effective operation limits and fully meet the technique requirements, the wind turbine rotor with adjustable pitch and variable rotation speed but more complicated structure is employed. With the increase of the wind speed, the wind turbine can work in wider operation limits such that the pitch of the blades can be adjusted by the pitch regulation to adapt the change of flow direction and avoid blade stall, and such that the operation efficiency is higher by speed change. However, the adjustable-pitch regulation mechanism and speed-change system increase the complexity of the wind turbine and thereby greatly increase the cost and maintenance work amount.

Non-grid-connected power generation involves non-grid-connected wind power. Wind power is directly used for the users, which helps to utilize and fully develop wind power. Thereby, not only the attack of wind power to the electrical power network is avoided, but also the unnecessary cost due to the severe conditions for synchronization of wind power to utility power system is decreased. Only greatly decreasing the cost of wind power can attract high power-consumption users to use wind power. Therefore, for breaking through the bottleneck of development of wind power, it is an extremely effective measure to vigorously develop non-grid-connected wind power. Upon many years of investigation and experiments, since high power-consumption users such as electrolytic aluminum industry, electrolytic copper industry, electrolytic manganese industry, salty water electrolyzing industry, seawater desalination industry mainly utilize the direct current to make large-scale production, they may directly utilize wind power. However, the present price of wind power is still high. Therefore, for greatly decreasing the cost of wind power and thereby accelerating the rapid development of the wind power industry, it is necessary to develop a wind turbine generator system with high efficiency, high reliability and low cost.

SUMMARY OF THE INVENTION

An objective of the present invention is to provide a non-grid-connected wind turbine generator system with high power, low cost, high efficiency, high reliability, simple and reasonable structure, convenient maintenance, and wide effective wind speed range, which can directly offer low-cost power for high energy consumption industries.

In the present invention, the non-grid-connected wind turbine generator system with high power, low cost and high efficiency is mainly composed of a wind rotor, a generator and a tower, being characterized in that the wind rotor is a fixed-pitch variable-rotation-speed wind rotor, the wind rotor shaft directly drives a rotor of the generator, and the generator is a power-controlled DC generator, a double-salient brushless DC generator, or a double-stator double-salient brushless DC generator.

The double-salient brushless DC generator with one outer stator and one inner stator refers to a double-salient brushless DC generator improved by changing single stator or two stators at one side into one outer stator and one inner stator. Particularly, the double-stator double-salient brushless DC generator comprises an inner stator, an outer stator and a rotor disposed between the inner stator and the outer stator; each of the inner stator, the outer stator and the rotor has salient poles, wherein each salient pole of the outer stator toward an inside of the outer stator is corresponding to each salient pole of the inner stator toward an outside of the inner stator, the number of salient poles of each stator is 6n; the number of salient poles of the rotor toward the outside of the inner stator and the number of salient poles of the rotor toward the inside of the outer stator is 4n respectively, where "n" is a positive integer; the salient poles of the rotor toward the outside of the inner stator are staggered with the salient poles of the rotor toward the inside of the outer stator by a mechanical angle of 60°/4n; each salient pole of the outer stator is provided with armature winding, wherein the armature windings on the salient poles having the same phase are connected in series to form one phase; each salient pole of the inner stator is provided with concentrated armature winding, wherein the armature windings on the salient poles having the same phase are connected in series to form one phase; the outer stator and the inner stator are embedded with exciting windings respectively.

Since wind power can be directly used for users, particularly for high power-consumption users which can accommodate the current fluctuating in specific range, such as electrolytic aluminum industry, electrolytic copper industry, electrolytic manganese industry, salty water electrolyzing industry, sea-water desalination industry mainly utilizing the direct current without any requirements of frequency and phase, the system can smoothly operate with high efficiency in a wide wind speed range. In the present invention, although a fixed-pitch wind rotor is used, the function of the fixed-pitch wind rotor has changed. The rotation speed of the fixed-pitch wind rotor in the present invention is directly controlled by a power-controlled generator and thereby the attack angle of wind rotor blade is controlled, so that the wind rotor is always in a state of high efficiency operation. When wind speed is greater than rated wind speed of the system, the wind rotor is controlled into a state of blade stall through control of the generator excitation current so as to limit power output of the wind rotor and effectively broaden the wind speed range of wind rotor. Thereby, use efficiency of wind power and operation range of the system is the same as or even superior to wind power system with the adjustable-pitch wind rotor, and is incomparable by the conventional wind power system with fixed-pitch. At the same time, the wind rotor shaft directly drives a rotor of the generator so that the structure is simplified and production cost is effectively reduced. Furthermore, the present invention uses the double-salient brushless DC generator in which the power output of the armature windings are directly used as power supply of the exciting windings, the working voltage of the exciting winding is zero and the stator has only a little remanence when the wind speed is not sufficient to drive the wind rotor. Thereby, it is helpful to operate the rotor when the wind speed is low. After operating the rotor, low voltage can be produced by remanence to provide small current for the exciting winding and make the magnetic field stronger gradually and thereby make the output voltage and current greater gradually. Such double-salient generator has weak field and excellent controllability. Moreover, using double-salient brushless DC generator with one inner stator and one outer stator would be more helpful to enhance the efficiency and reduce the volume and weight of the system. The wind turbine generator system has such advantages as simple reliable structure, convenient maintenance, low equipment cost, low electricity price, high efficiency and wide effective wind speed range and is suitable for large scale usage at wind power station. Such system is mainly used to directly supply non-grid-connected wind power to users; or, several such systems are connected with each other to faun a special wind power local area network for directly supply power to users. If necessary, the direct current can be converted by an inverter into alternating current with the same frequency, phase and voltage as the commercial power network, so as to supply power to the commercial power network.

DETAILED DESCRIPTION OF THE PREFERRED EMBODIMENTS

The following embodiment is only for illustration, which would not be limit to the present invention.

Figure 1:
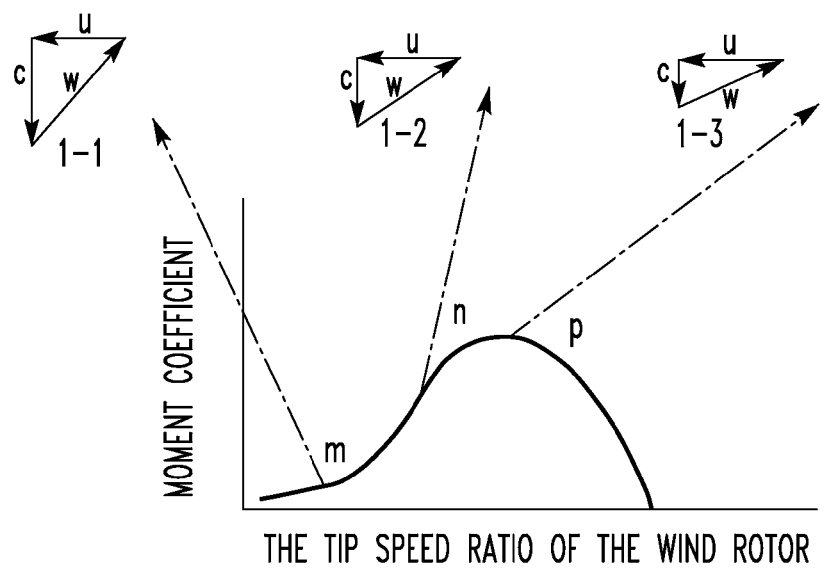
FIG. 1 is a graph of the moment coefficient versus the tip speed ratio of the wind rotor for illustrating the relationship between the flow speed and the airfoil during the blade stall, wherein portion 1-1 shows the speeds in deep stall state at point m of the curve therein, portion 1-2 shows the speeds in shallow stall state at point n of the curve, portion 1-3 shows the speeds in non-flow-separation state at point p of the curve, where "c" in portion 1-1, 1-2 and 1-3 represents axial seed related to the wind seed "u" represents tangent speed related to rotational speed of the wind rotor, and "w" represents relative speed related to the blade of the wind rotor.

FIG. 1 is a graph of the moment coefficient versus the tip speed ratio of the wind rotor and provides schematic view according to the relationship between the flow speed and the airfoil during the blade stall. The non-grid-connected wind turbine generator system uses the fixed-pitch wind turbine and an adjusting system so that high-efficiency operation is realized in the wide wind speed range without pitch regulation mechanism and overload can be avoided in the event of high wind speed. When the wind speed is relatively low, the rotation speed of the wind turbine rotor is adjusted by a controlling system. The tangent speed u is changed and the wind flows into along the front edge of blade at the relative wind speed w, so that the blade is always in a state of optimum attack angle and thereby the wind rotor has higher power output. When the wind speed is relatively high, in order to reduce the power output of the wind rotor to avoid system overload, the rotation speed of the wind rotor is changed by rotation speed adjustment system of the wind turbine rotor (e.g. increasing the exciting current of the generator), and thereby the tip speed ratio is adjusted so that the attack angle of blade with respect to the wind speed w is increased and the wind rotor is brought into stall state. With the increase of the wind speed, the usage efficiency of wind energy is reduced to ensure the stability of power output; at the same time, axial thrust coefficient of the wind rotor is reduced with the decrease of the tip speed ratio. Thereby, the security of the wind rotor structure is enhanced. The rotation speed of the fixed-pitch variable-rotation-speed wind rotor is adjusted by controlling an exciting current of the generator so that the wind rotor is always in a state of high efficiency operation; when the wind speed is greater than a rated wind speed of the system, the wind rotor is controlled into a state of blade stall so as to limit power output of the wind rotor.

Figure 2:
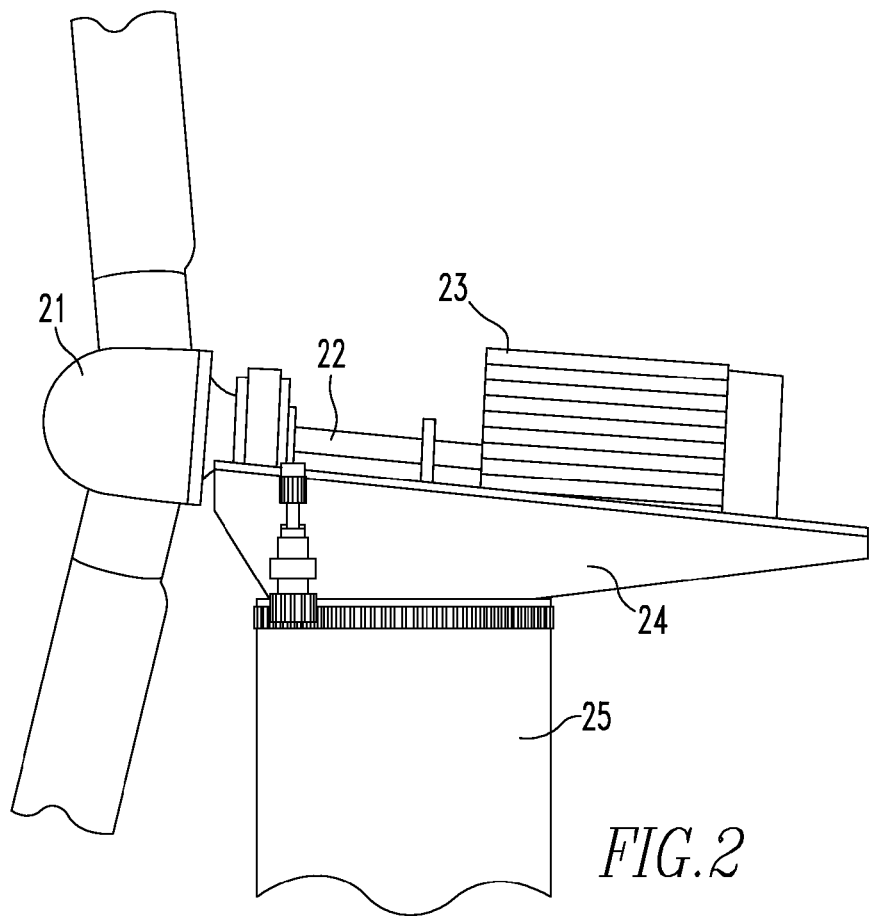
FIG. 2 is a view of the structure of the present invention.

FIG. 2 is a view of the structure of the present invention. The reference numeral "21" represents a wind rotor, "22" represents a wind rotor shaft, "23" represents a generator, "24" represents a generator stand, "25" represents a tower. The present invention is mainly composed of the wind rotor 21, the generator 23 and the tower 25, which is characterized in that the wind rotor 21 is a wind rotor with fixed pitch and variable rotation speed, the wind rotor shaft 22 directly drives the rotor of the generator 23, and the generator is preferably a double-salient brushless DC generator with one inner stator and one outer stator, or a general double-salient brushless DC generator, or other power-controlled DC generator.

Figure 3:
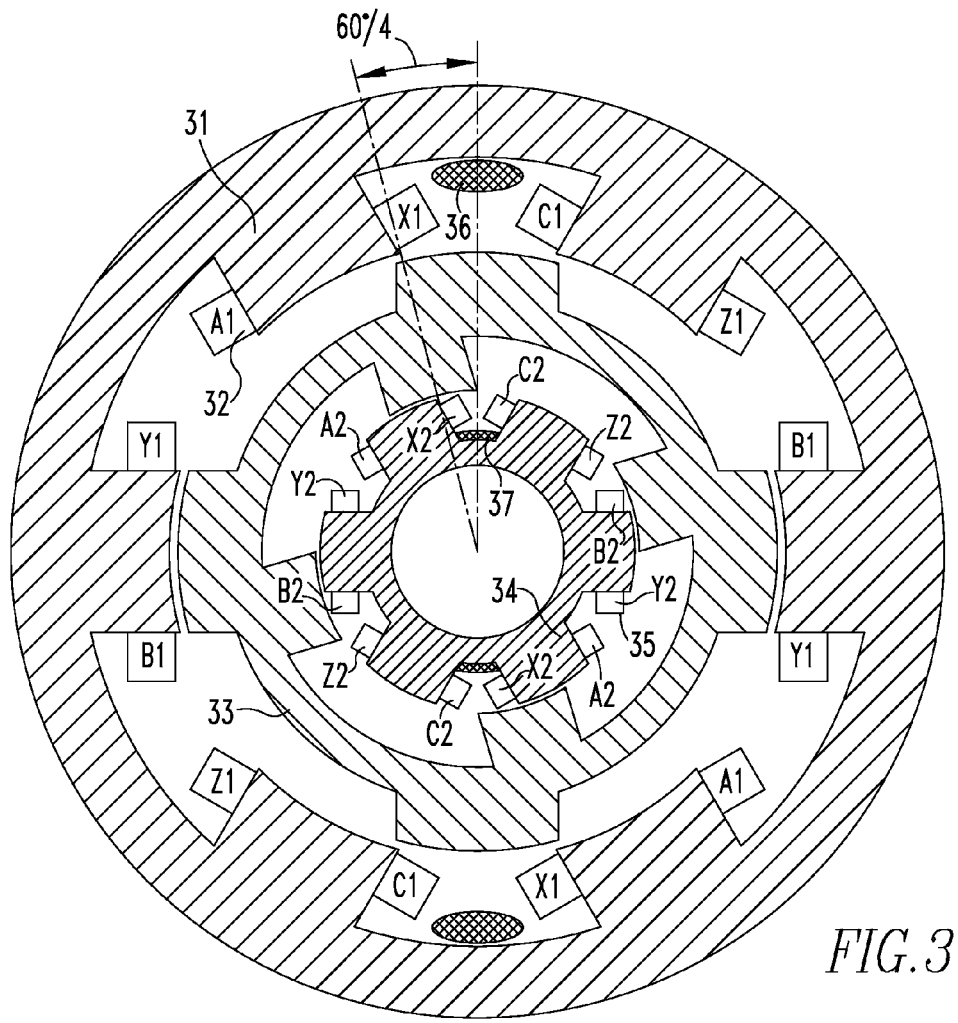
FIG. 3 is a structure view of the double-salient brushless DC generator with one inner stator and one outer stator in the present invention.

FIG. 3 is a structure view of the double-salient brushless DC generator with one inner stator and one outer stator in FIG. 2. In FIG. 3, the reference numeral "31" represents the outer stator of the generator, "32" represents the armature winding on the outer stator; "33" represents the rotor of the generator, "34" represents the inner stator of the generator; "35" represents the armature winding on the inner stator; "36" represents the exciting winding for the outer stator, "37" represents the exciting winding for the inner stator; A1, X1, B1, Y1, C1 and Z1 represent the terminals of A, B and C phases. Where the double-salient brushless DC generator with one inner stator and one outer stator is a three-phase generator, it has a 6n/4n/4n/6n pole structure, that is, the number of poles of the outer stator is 6n, the number of poles at outer side of the rotor is 4n, the number of poles at inner side of the rotor is 4n, and the number of the inner stator is 6n, where n is a positive integer. The salient pole at outer side of the rotor and the salient pole at inner side of the rotor are staggered by the electrical angle of 60°. (i.e. the corresponding mechanical angle is 60°/4n). As an embodiment, for convenience, FIG. 3 shows the sectional view of the three-phase inner-outer-stator double-salient brushless DC generator with 6/4 poles. The outer stator 31 has six salient poles toward inside and the concentrated armature winding 32 is provided on each salient pole. The armature winding on one salient pole is in series connected to the armature winding on the opposite salient pole so that three-phase windings A1-X1, B1-Y1 and C1-Z1 are formed. The inner stator 34 has six salient poles toward outside, which are corresponding to the six salient poles of the outer stator 31. Similarly, the armature winding 35 is provided on each salient pole. The armature winding on one salient pole is in series connected to the armature winding on the opposite salient pole so that three-phase windings A2-X2, B2-Y2 and C2-Z2 are formed. The rotor 33 is disposed between the outer stator 31 and the inner stator 34. The rotor 33 has four salient poles toward inside and four salient poles toward outside, and the salient pole at outside of the rotor and the salient pole at inside of the rotor are staggered by the mechanical angle of 15° (i.e. the corresponding electrical angle is 60°). In this embodiment, as magnetic potential source of the generator, the exciting winding is provided with direct current. In detail, the exciting winding 36 is embedded in the slot of the outer stator 31, the exciting winding 37 is embedded in the slot of the inner stator 3. The two terminals of the exciting winding 31, 36 are connected with the direct current output from the armature winding directly or via a control circuit.

The outputs of the armature windings on the inner stator and the outer stator are rectified via a three-phase half-wave common-anode rectifying circuit, a three-phase half-wave common-cathode rectifying circuit or a three-phase full-bridge rectifying circuit, to output the direct current, and then are further connected therebetween. The connection relationship of these circuits is shown in FIG. 4-FIG. 9.

Figure 4:
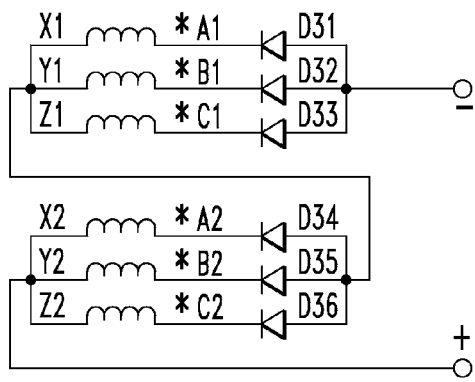
FIG. 4 and FIG. 5 are views for illustrating the principle of a three-phase half-wave common-anode rectifying circuit in the double-salient brushless DC generator with one inner stator and one outer stator.
Figure 5:
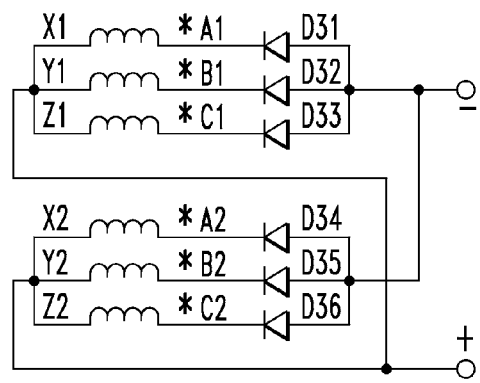

FIG. 4 and FIG. 5 show the three-phase half-wave common-anode rectifying circuit. The outputs of three-phase armature windings A1-X1, B1-Y1 and C1-Z1 on the outer stator are half-wave rectified via three common-anode rectifying diodes D31, D32 and D33. The outputs of three-phase armature windings A2-X2, B2-Y2 and C2-Z2 on the inner stator are half-wave rectified via three common-anode rectifying diodes D34, D35 and D36. The two rectified outputs are connected in series (FIG. 4) or in parallel (FIG. 5).

Figure 6:
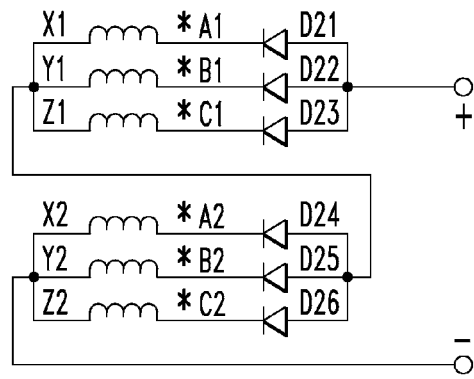
FIG. 6 and FIG. 7 are views for illustrating the principle of a three-phase half-wave common-cathode rectifying circuit in the double-salient brushless DC generator with one inner stator and one outer stator.
Figure 7:
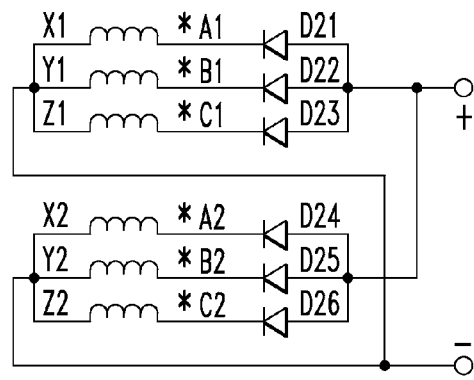

FIG. 6 and FIG. 7 show the three-phase half-wave common-cathode rectifying circuit. The outputs of three-phase armature windings A1-X1, B1-Y1 and C1-Z1 on the outer stator are half-wave rectified via three common-cathode rectifying diodes D21, D22 and D23. The outputs of three-phase armature windings A2-X2, B2-Y2 and C2-Z2 on the inner stator are half-wave rectified via three common-cathode rectifying diodes D24, D25 and D26. The two rectified outputs are connected in series (FIG. 6) or in parallel (FIG. 7).

Figure 8:
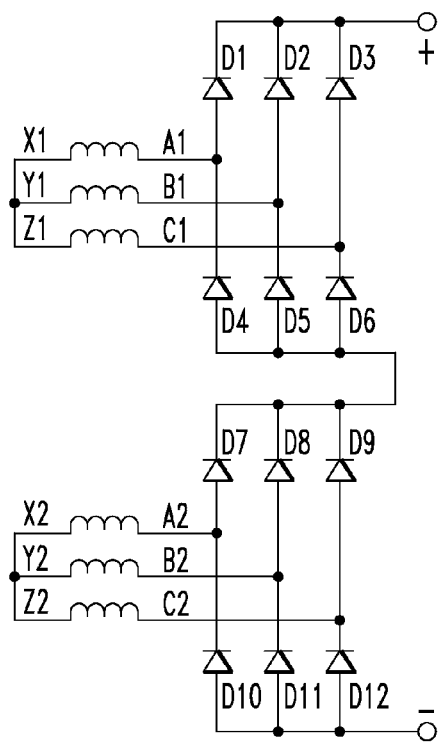
FIG. 8 and FIG. 9 are views for illustrating the principle of a three-phase full-bridge rectifying circuit in the double-salient brushless DC generator with one inner stator and one outer stator.
Figure 9:
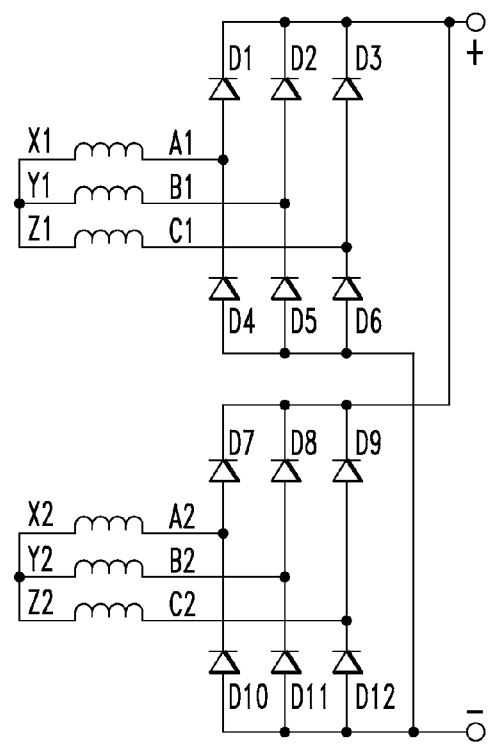

FIG. 8 and FIG. 9 show the three-phase full-bridge rectifying circuit. The outputs of three-phase armature windings A1-X1, B1-Y1 and C1-Z1 on the outer stator are rectified via the full bridge rectifying circuit composed of six power diodes D1~D6. The outputs of three-phase armature windings A2-X2, B2-Y2 and C2-Z2 on the inner stator are rectified via the full bridge rectifying circuit composed of six power diodes D7~D12. The two rectified outputs are connected in series (FIG. 8) or in parallel (FIG. 9).

What is claimed is:

1. A non-grid-connected wind turbine generator system comprising a wind rotor, a generator and a tower, wherein the wind rotor is a fixed-pitch variable-rotation-speed wind rotor, the wind rotor shaft directly drives a rotor of the generator, and the generator is a power-controlled DC generator, a double-salient brushless DC generator, or a double-stator double-salient brushless DC generator, wherein the double-stator double-salient brushless DC generator comprises an inner stator, an outer stator and a rotor disposed between the inner stator and the outer stator; each of the inner stator, the outer stator and the rotor has salient poles, wherein each salient pole of the outer stator toward an inside of the outer stator is corresponding to each salient pole of the inner stator toward an outside of the inner stator, the number of salient poles of each stator is 6n; the number of salient poles of the rotor toward the outside of the inner stator and the number of salient poles of the rotor toward the inside of the outer stator is 4n respectively, where "n" is a positive integer; the salient poles of the rotor toward the outside of the inner stator are staggered with the salient poles of the rotor toward the inside of the outer stator by a mechanical angle of 60°/4n; each salient pole of the outer stator is provided with an armature winding, wherein the armature windings on the salient poles having the same phase are connected in series to form one phase; each salient pole of the inner stator is provided with a concentrated armature winding, wherein the armature windings on the salient poles having the same phase are connected in series to form one phase; and the outer stator and the inner stator are embedded with exciting windings respectively.

2. The non-grid-connected wind turbine generator system as set forth in claim 1, wherein the rotation speed of the fixed-pitch variable-rotation-speed wind rotor is adjusted by controlling an exciting current of the generator so that the wind rotor is always in a state of high efficiency operation; and when wind speed is greater than rated wind speed of the system, the wind rotor is controlled into a state of blade stall so as to limit power output of the wind rotor.

* * * * *